(12) United States Patent
Singh (10) Patent No.: US 10,958,628 B2
(45) Date of Patent: *Mar. 23, 2021

(54) PROTECTING SENSITIVE DATA IN A DISTRIBUTED LEDGER SYSTEM USING A BLOCKCHAIN CHANNEL HIERARCHY

(71) Applicant: International Business Machines Corporation, Armonk, NY (US)

(72) Inventor: Kapil Kumar Singh, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 324 days.

This patent is subject to a terminal disclaimer.

(21) Appl. No.: 15/845,752

(22) Filed: Dec. 18, 2017

(65) Prior Publication Data

US 2019/0190896 A1 Jun. 20, 2019

(51) Int. Cl.
*H04L 29/06* (2006.01)
*G06F 21/62* (2013.01)

(52) U.S. Cl.
CPC .......... *H04L 63/0435* (2013.01); *G06F 21/62* (2013.01); *H04L 63/12* (2013.01); *H04L 63/20* (2013.01); *G06F 21/6245* (2013.01)

(58) Field of Classification Search
CPC ..... H04L 63/0435; H04L 63/12; H04L 63/20; G06F 21/62; G06F 21/6245
See application file for complete search history.

(56) References Cited

U.S. PATENT DOCUMENTS

| | | |
|---|---|---|
| 2015/0244690 A1 | 8/2015 | Mossbarger |
| 2016/0191243 A1 | 6/2016 | Manning |
| 2016/0261411 A1 | 9/2016 | Yau et al. |
| 2018/0089436 A1* | 3/2018 | Smith .................. H04L 9/3234 |
| 2018/0349621 A1* | 12/2018 | Schvey .................. G06F 21/40 |
| 2019/0081796 A1* | 3/2019 | Chow .................. H04L 9/3247 |
| 2019/0104196 A1* | 4/2019 | Li ....................... G06F 16/2379 |

* cited by examiner

*Primary Examiner* — Dao Q Ho
(74) *Attorney, Agent, or Firm* — Jeffrey S. LaBaw; David H. Judson (57) ABSTRACT

A blockchain hierarchy comprises an arrangement of blockchain channels organized such that a blockchain channel at a lower level feeds data to another blockchain channel, e.g., a relatively higher level. At least one blockchain channel comprises a private autonomous subset of peers in the set of peers that comprise the blockchain network. Within that particular subset, one of the peers is elected as a leader entity, which has the capability of also joining another private or public blockchain channel, e.g., one at a higher level in the hierarchy. The leader entity includes a capability to enforce a data protection policy within the blockchain channel that it leads. To this end, the leader filters or declassifies data based on some task-specific (or blockchain channel-specific) data protection policy, and it then makes that data available to one or more other blockchain channels in the hierarchy (directly or indirectly).

12 Claims, 7 Drawing Sheets

PROTECTING SENSITIVE DATA IN A DISTRIBUTED LEDGER SYSTEM USING A BLOCKCHAIN CHANNEL HIERARCHY

BACKGROUND

Technical Field

This disclosure relates generally to transaction processing using highly-scalable, decentralized peer-to-peer (P2P) networks, known as blockchains.

Background of the Related Art

Blockchain is a type of business transaction ledger. A blockchain network is a decentralized system for the exchange of assets. It uses a shared ledger (that is either public or private) for recording the history of electronic business transactions that take place in a peer-to-peer (P2P) business network. A blockchain network uses a decentralized consensus mechanism or protocol. In particular, all validating nodes in the network run the same (agreed-upon) consensus algorithm against the same transactions, and thus validate (or invalidate) each transaction. Transactions update the ledger. A blockchain peer-to-peer network is resilient given its decentralized topology. As member nodes join or leave the network dynamically, messages are exchanged between the network participants on a best-effort broadcast basis.

In a large distributed infrastructure, it is known that multiple mutually-distrusting parties may still desire to contribute data towards a common goal. For example, consider a large Internet of Things (IoT) network for an automobile manufacturer; such a network might involve sensor-based data collection across automobiles owned by users, by car dealerships, by parts suppliers, by supply lines and others. Every participating entity can have its individual or organizational policies for data sharing, and such policies might need to be agile. Enforcing such diverse policies effectively in a large network is quite challenging, and there remains a need for doing so using a common framework, e.g., one that would allow data sharing effectively while still providing autonomy and data isolation for each participating entity.

This disclosure addresses this need.

BRIEF SUMMARY

According to this disclosure, a blockchain hierarchy comprises an arrangement of blockchain channels within a blockchain network that are preferably organized in a tree-like manner such that a channel at a first (typically "lower") level of the hierarchy feeds data to a channel a second (typically a relatively "higher") level of the hierarchy. At least one channel in the hierarchy typically is "private" in the sense that it comprises a private autonomous group of peers (computing entities) that are involved in a particular task. Within that particular group of peers, preferably one of the peers is elected as a leader entity, and that leader entity has the capability of also joining another channel in the blockchain, e.g., a channel at a higher level in the hierarchy (which itself may be private or public). Additionally, the leader entity preferably includes a capability to enforce a data protection policy within the private blockchain channel that it leads. Enforcing the protection policy may involve different types of operations, such as aggregation, filtering, anonymization, declassification, normalizing, and others, as well as combinations of such operations. Other types of policies (besides data protection) may also be implemented and enforced within a given level (as well as across levels) of the hierarchy.

Thus, in one example scenario, the leader entity filters or declassifies data based on some task-specific (or blockchain channel-specific) data protection policy, and it then makes that data available to one or more other channels in the hierarchy (either directly by being part of some other blockchain channel higher up, or indirectly by providing the data up the hierarchy). This process of appointing a leader that (in this example) performs declassification and/or filtering may be repeated at other levels in the hierarchy, e.g., based on the task/entity formulation and trust relationships among the participating parties. As a further aspect, data protection policy enforcement (and by example the resulting declassification or filtering) within a particular blockchain channel (or even across levels) may be verified by one or more other validating peers in the blockchain channel, or in other parts of the network.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

A blockchain is a permanent digitized chain of transactions, grouped into blocks, that ensures that participants cannot tamper with or deny past transactions. A permissioned blockchain is one in which the participants who invoke business transactions, as well as those who control and manage copies of the blockchain, are known. To this end, an identity service in a permissioned blockchain typically links information about business entities to the cryptographic keys used to digitally sign transactions. Typically, a ledger comprises a blockchain, and an associated world state. The world state typically is a view, but can be a superset, of the blockchain that comprises a set of referenceable variables that, while necessarily recorded in the blockchain, can be utilized by programs running on the network. In particular, to update the ledger with a proposed transaction, each node must process the transaction against the logic of one or more programs running directly on the replicated network. These programs, called chaincode, are replicated across each node in the network to guarantee uptime and functionality. Chaincode is stored on the blockchain and triggered by transaction requests.

Figure 1:
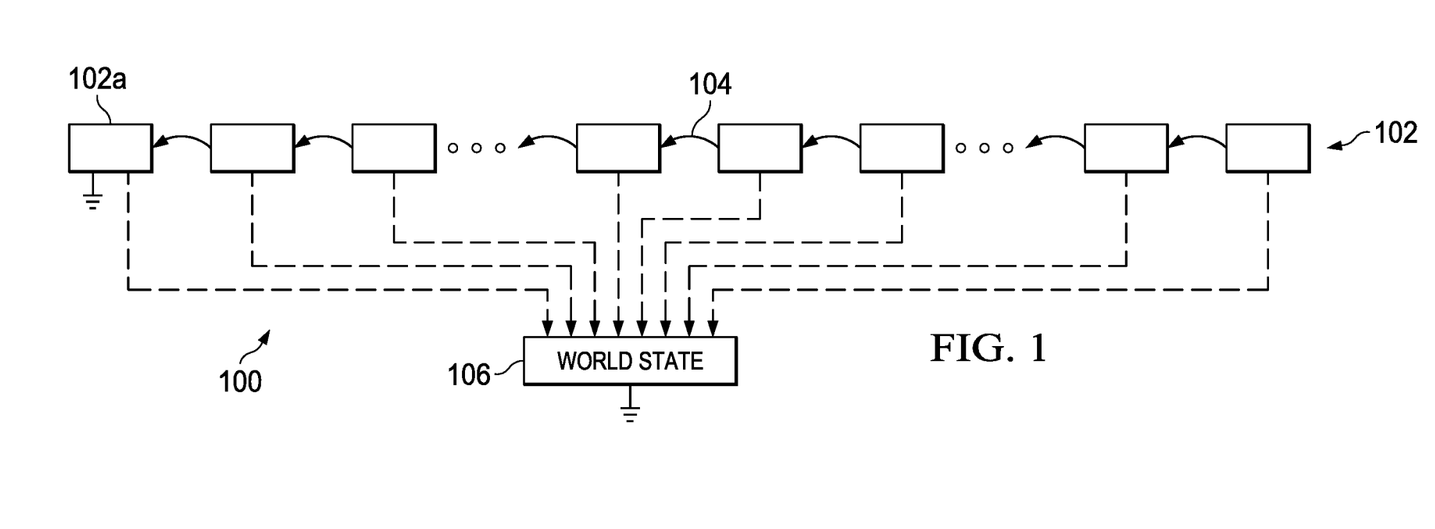
FIG. 1 depicts an exemplary blockchain structure.

Referring now to FIG. 1, and by way of background, a representative blockchain 100 is depicted by blocks 102, with each block pointing back to a previous block. The pointer 104 is a hash of the previous block. Depending on how the chain 100 is stored, a record containing the hash may contain the address or other information that makes identifying the previous blocks simpler. The leftmost block 102a represents a genesis (first) block of the blockchain 100. A world state 106 is empty at the genesis block, and it is progressively filled as the blockchain proceeds to incorporate additional transactions. Transactions, as recorded in the blocks, modify the world state. Although not depicted, the blockchain may support sub-chains (also known as sub-ledgers), in which case the approaches described herein apply independently to each sub-chain.

The blockchain "state" comprises the world state 106 and the blockchain 100. The world state is a current state of stored variables (e.g., a ledger view, typically instantiated in a key/value store), and the blockchain itself, which is the linked blocks of transactions with secure hashes representing the transactions that were successful or unsuccessful. There may be multiple possible representations of the world state, e.g., a full world state representation, a delta-based world state representation, or a mixed representation world state. Alternatively, the world state may be a logical view into the blockchain, where the world state is a key/value store abstraction. In such an embodiment, the world state is implemented as a set of keys with associated references to the actual data (values) in the blockchain blocks.

A checkpoint of a full state of the blockchain may be performed, e.g., on some periodic basis, typically as defined by a policy. Typically, the checkpoint is performed between two blocks in the blockchain. Once checkpoint processing has begun, no changes are permitted to the state (world state, blockchain) until consensus is reached on the checkpoint state. The checkpointed world state is written or otherwise saved.

As depicted in FIG. 1, the world state is shown as separate from the blockchain, but this is not a requirement. When the world state is contained in the blockchain itself, the resulting composite structure is sometimes referred to as a "ledger." When the world state is separate from the blockchain, the notion of a "ledger" refers to the state recorded in the blockchain (as opposed to the world state).

Hyperledger is a cross-industry collaborative effort to support permissioned blockchain-based distributed ledgers. It is focused on ledgers designed to support global business transactions, including major technological, financial, and supply chain companies, with the goal of improving many aspects of performance and reliability. The project aims to bring together a number of independent efforts to develop open protocols and standards by providing a modular framework that supports different components for different uses. A Hyperledger is a peer-to-peer distributed network that uses cryptographic security, decentralized consensus, and a shared public ledger with properly-controlled and permissioned visibility.

To bring new validating peers into a blockchain network, such as a permissioned blockchain like Hyperledger, it is necessary to transmit the blockchain state from one or more of the network peers to the new peer. To support the efficient and rapid addition of new validating (and non-validating) peer nodes in a blockchain network, a mechanism is provided for identifying the current state of the blockchain so it can be efficiently communicated to the new peer nodes, and enable them to start participating in the network.

Figure 2:
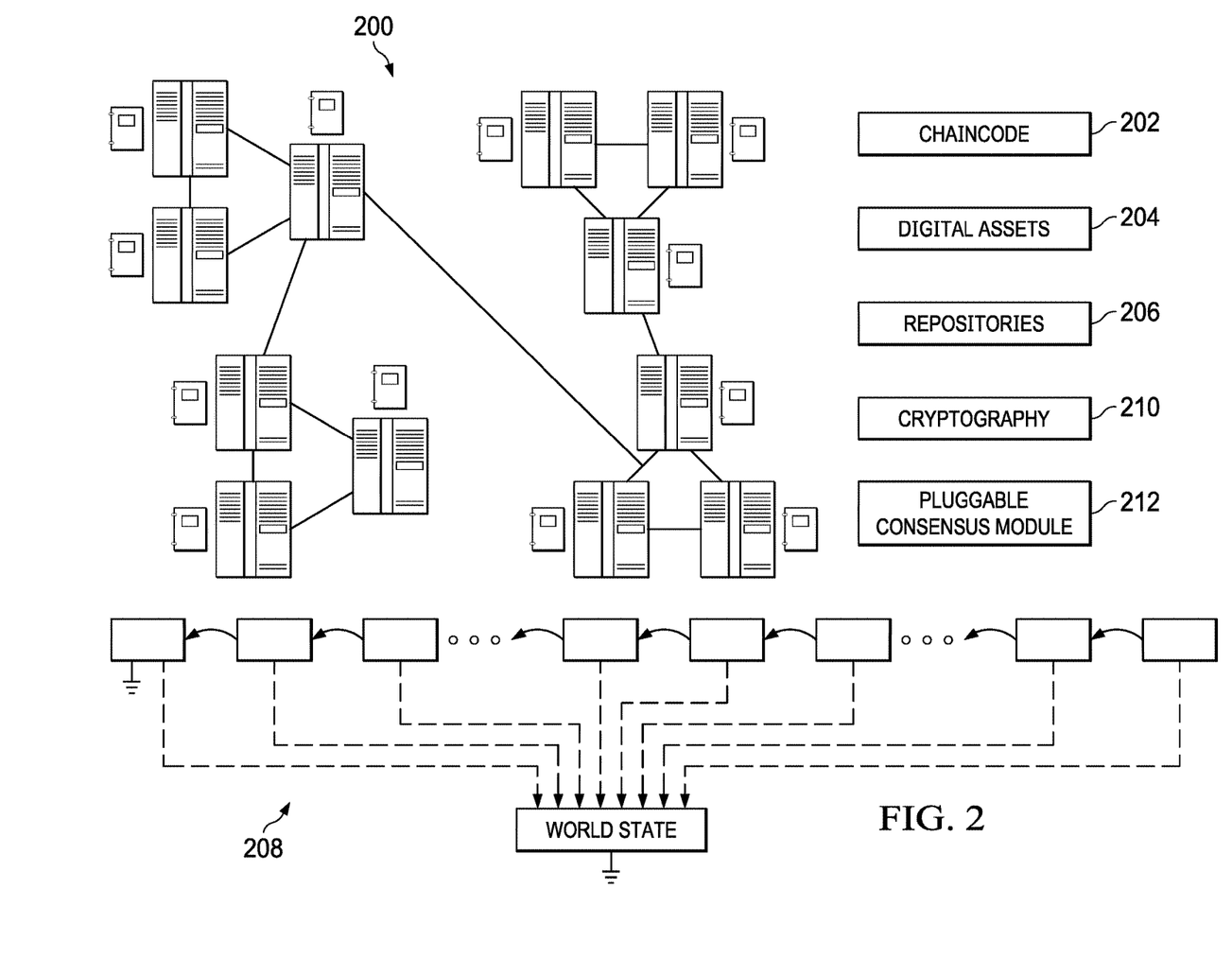
FIG. 2 is an exemplary block diagram of a peer-to-peer network comprising a blockchain business network in which the techniques of this disclosure may be implemented.

As depicted in FIG. 2, typically a blockchain is implemented in the context of a distributed peer-to-peer network 200 in which the nodes make independent processing and computational decisions irrespective of what other peer nodes may decide. To form a blockchain network, the various computing entities (nodes) in the peer-to-peer network have associated therewith a decentralized consensus mechanism. In particular, all validating nodes in the network run the same (agreed-upon) consensus algorithm against the same transactions, and thus validate (or invalidate) each transaction. Valid transactions are written to the ledger. As depicted, the central elements of a blockchain implementation are chaincode 202, digital assets (that underlie the transactions) 204, record repositories 206, the blockchain and world state 208 providing consensus, and cryptographic security 210. In addition, an exemplary Hyperledger implementation preferably supports a pluggable consensus model 23 that allows for a variety or specialized or optimized consensus algorithms to be applied.

Preferably, the blockchain 208 is a shared, permissioned ledger that is visible to all participating members of the business network. A consensus protocol is agreed to by all participating members of the business network, and it ensures that the ledger is updated only with network-verified transactions. Cryptography 210 ensures tamper-proof security, authentication, and integrity of transactions. Cryptographic functions including hashing and digital signatures. Hashing ensures integrity of the transaction input. Digital signatures ensure that the receiver receives the transactions without middle parties modifying or forging the contents of transactions, while also ensuring that the transactions originated from senders (signed with private keys) and not imposters. The chaincode 202 encapsulates participant terms of agreements for the business that takes place on the network; this code preferably is stored on the validating nodes in the blockchain and triggered by transactions. When configured as an append-only system of record (SOR) and visible to all participating members of the business network, a shared, permissioned ledger is created.

Figure 3:
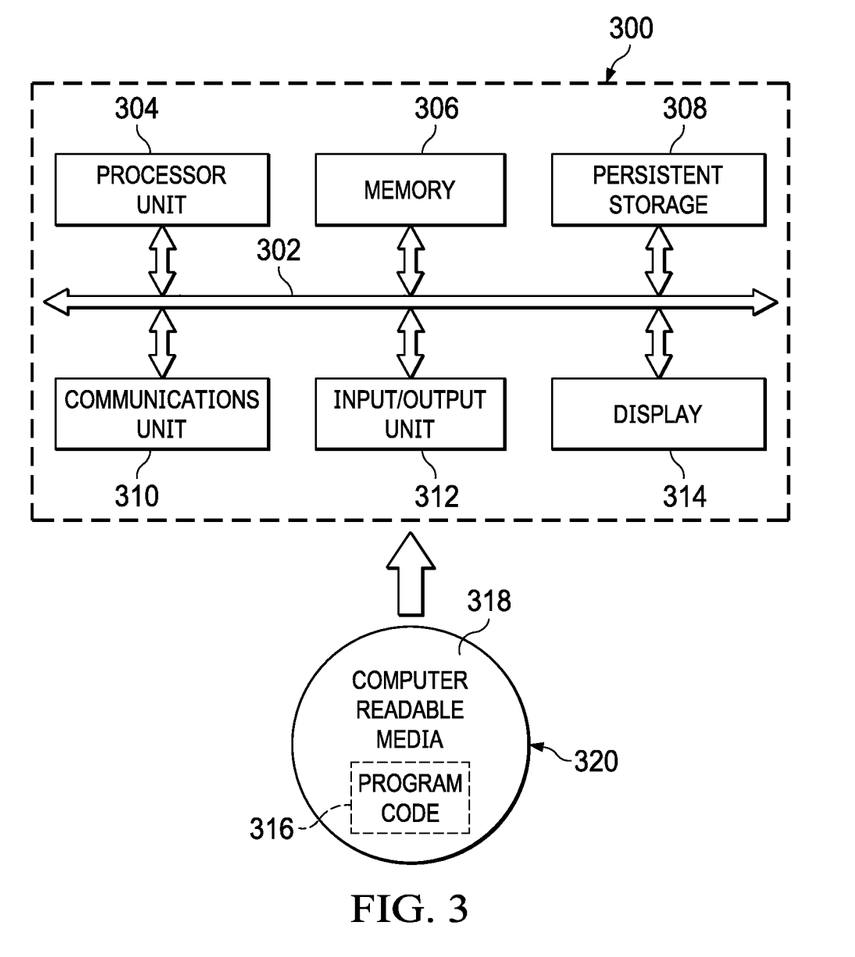
FIG. 3 depicts data processing system in which exemplary aspects of the illustrative embodiments may be implemented.

With reference now to FIG. 3, a block diagram of an exemplary data processing system is shown for use as a computing entity or validating peer of a blockchain network such as described above. Data processing system 300 is an example of a computer in which computer usable code or instructions implementing the processes for illustrative embodiments of the disclosure may be located. System 300 typically represents one of the computing entities (validating peers) in the peer-to-peer distributed network as depicted in FIG. 3.

In this illustrative example, data processing system 300 includes communications fabric 302, which provides communications between processor unit 304, memory 306, persistent storage 308, communications unit 310, input/output (I/O) unit 33, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor (SMP) system containing multiple processors of the same type.

Memory 306 and persistent storage 308 are examples of storage devices. A storage device is any piece of hardware that is capable of storing information either on a temporary basis and/or a permanent basis. Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 33 allows for input and output of data with other devices that may be connected to data processing system 300. For example, input/output unit 33 may provide a connection for user input through a keyboard and mouse. Further, input/output unit 33 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer-usable program code, or computer-readable program code that may be read and executed by a processor in processor unit 304. The program code in the different embodiments may be embodied on different physical or tangible computer-readable media, such as memory 306 or persistent storage 308.

Program code 316 is located in a functional form on computer-readable media 318 that is selectively removable and may be loaded onto or transferred to data processing system 300 for execution by processor unit 304. Program code 316 and computer-readable media 318 form computer program product 320 in these examples. In one example, computer-readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer-readable media 318 also may take the form of a persistent storage, such as a hard drive, a thumb drive, or a flash memory that is connected to data processing system 300. The tangible form of computer-readable media 318 is also referred to as computer-recordable storage media. In some instances, computer-recordable media 318 may not be removable.

Alternatively, program code 316 may be transferred to data processing system 300 from computer-readable media 318 through a communications link to communications unit 310 and/or through a connection to input/output unit 33. The communications link and/or the connection may be physical or wireless in the illustrative examples. The computer-readable media also may take the form of non-tangible media, such as communications links or wireless transmissions containing the program code. The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown. As one example, a storage device in data processing system 300 is any hardware apparatus that may store data. Memory 306, persistent storage 308, and computer-readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache such as found in an interface and memory controller hub that may be present in communications fabric 302.

Computer program code for carrying out operations of the present invention may be written in any combination of one or more programming languages, including an object-oriented programming language such as Java™, Smalltalk, C++ or the like, functional programming languages such as SML, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIG. 3 may vary depending on the implementation. Other internal hardware or peripheral devices, such as flash memory, equivalent non-volatile memory, or optical disk drives and the like, may be used in addition to or in place of the hardware depicted in FIG. 3. Also, the processes of the illustrative embodiments may be applied to a multi-processor data processing system, other than the SMP system mentioned previously, without departing from the spirit and scope of the disclosed subject matter.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 3) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Protecting Sensitive Data in a Distributed Ledger System Using a Blockchain Hierarchy With the above as background, the technique of this disclosure are now described.

Figure 4:
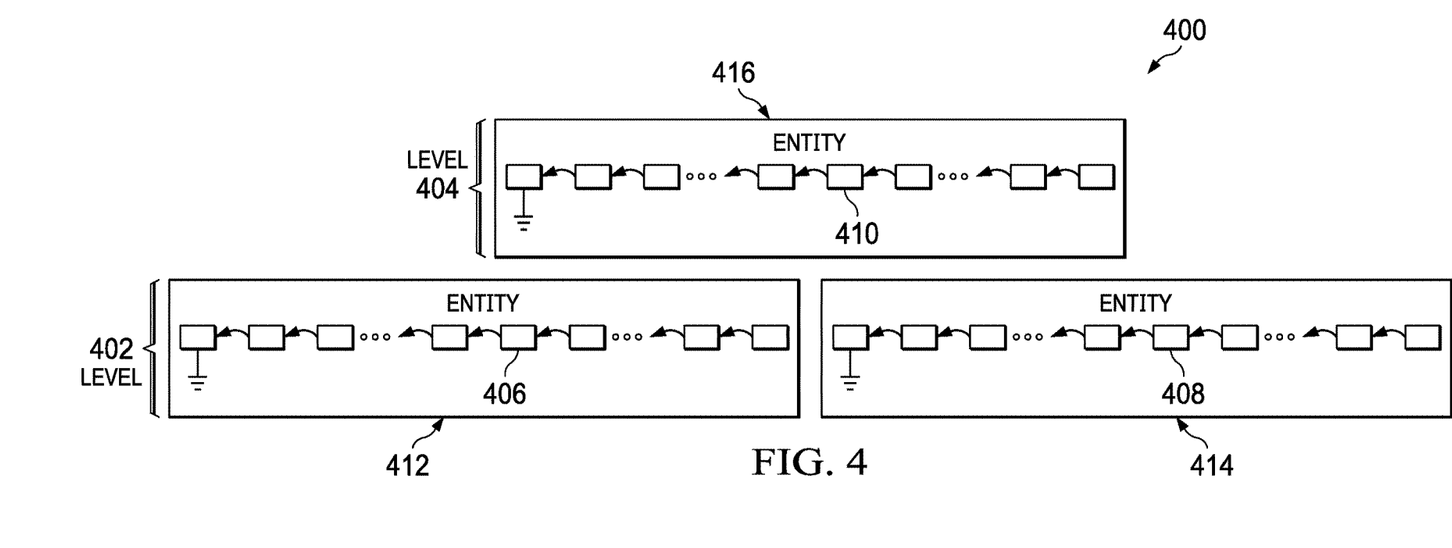
FIG. 4 depicts a hierarchy of autonomous blockchain networks that enables policy-driven data protection or segmentation according to this disclosure.

As referenced above, the basic notion of this disclosure provides a framework that enables a hierarchy of preferably autonomous blockchain networks that enables policy-driven data protection/segregation within the network. In general, this is achieved by arranging blockchains in a hierarchy, e.g., a tree-like hierarchy in which one or more of the lower blockchains feed data to one or more higher ones in the tree. FIG. 4 depicts this basic configuration. In this example scenario, the network 400 comprises two (2) levels, a first (lower) level 402, and a second (relatively higher) level 404. As depicted in this example, there are two (2) blockchains configured or positioned in the lower level. These are blockchains 406 and 408, and blockchain 406 is associated with entity 412, and blockchain 408 is associated with entity 414. Entities 412 and 414 may be distinct business entities, or they may be sub-entities associated with a single business or other enterprise (e.g., company divisions). The higher level includes blockchain 410, and this blockchain is associated with entity 416.

Figure 5:
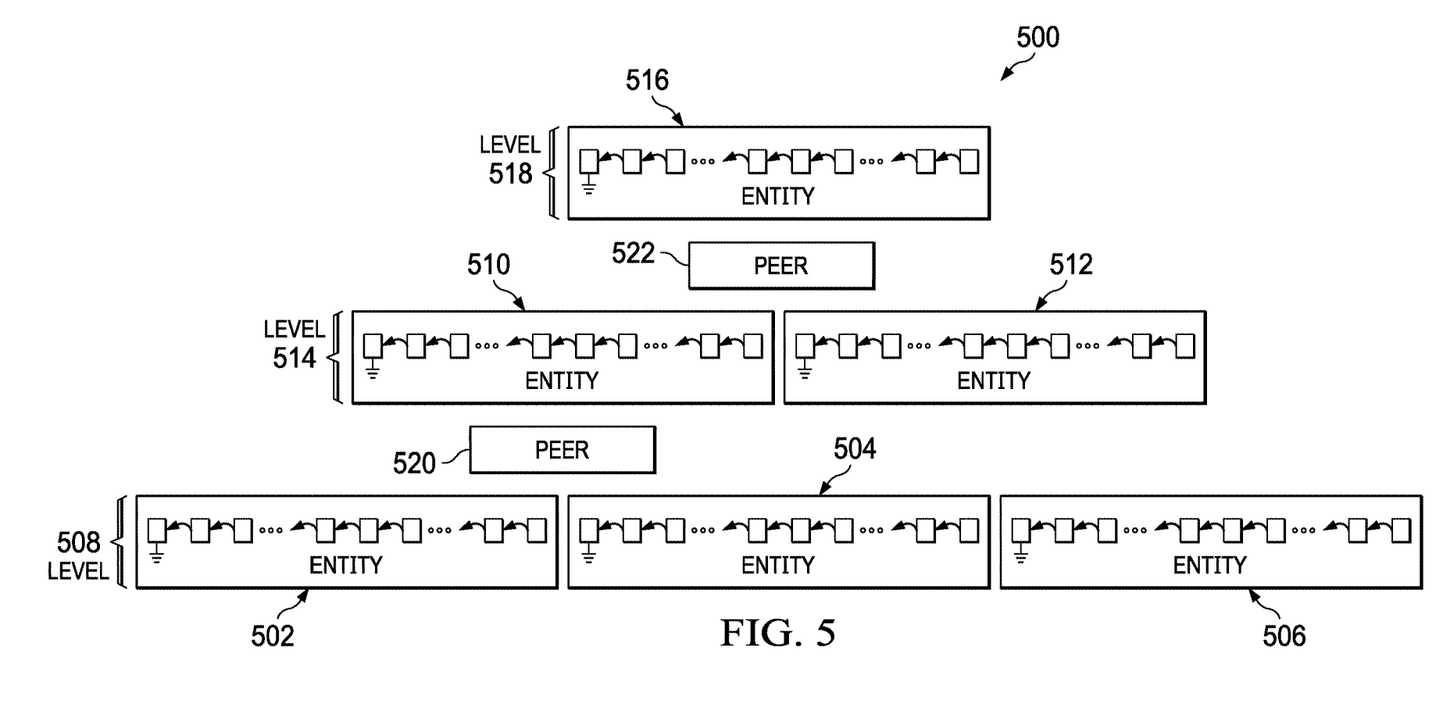
FIG. 5 depicts a multi-level tree-like hierarchy of a first embodiment of this disclosure and showing a leader peer elected for a particular blockchain also participating as a peer in a blockchain at a higher level in the hierarchy.

FIG. 4 depicts a simple tree-like hierarchy with just two (2) levels, but this is not a limitation. As will be described below (and as depicted in FIG. 5), the hierarchy may comprise multiple levels, and there may be one or more blockchains per level. Thus, FIG. 4 may comprise just a portion of much larger hierarchy. Further, the notion of a "tree-like" hierarchy, while a typical implementation, also is not intended to be limiting, as other hierarchical blockchain configurations (in whole or in part) may be implemented according to the framework. A particular blockchain may be private or public, and it may be permission-based, or permissionless-based.

Preferably, each blockchain (such as each of the blockchains 406, 408 and 410) forms a private autonomous group of peers involved in a particular task (e.g., sensor data for a particular car dealership). A peer typically is a computing entity, such as depicted in FIG. 2 and described above. More generally, the peer can be any type of network-accessible computing device including, without limitation, an IoT endpoint. A group of peers that comprise a blockchain may be co-located or distributed from one another, and (except for the leader peer that participates in the blockchain at a higher-up level as will be described) typically each blockchain is associated with a group of peers that are located remotely from the group of peers that comprise another blockchain.

According to another aspect of this disclosure, and within a particular blockchain of the hierarchy (which blockchain typically is private), different types of data processing operations, such as aggregation, filtering, anonymization, declassification, normalizing, and others, as well as combinations of such operations, may be carried out on the data. In a typical scenario, these operations comprise filtering and declassification in accordance with a data protection policy. Other types of policies (besides data protection) may also be implemented and enforced within a given level of the hierarchy, and the operations associated with a particular policy or its enforcement may vary.

In a representative use case, data is filtered or declassified, preferably based on one or more task-specific (or blockchain-specific) data protection policies. In one exemplary embodiment, the enforcement of such policies (and declassification/filtering) is verified by other validating peers in the private blockchain. Taking the automotive example above (with the IoT endpoints), a car dealership can choose not to share data about specific inventory up the tree to the car manufacturer, even though that data is recorded at the blockchain of the dealership. This approach also prevents unintended data leaks by individual sensors/peers in the blockchain as the data is filtered and declassified before sharing outside the private blockchain.

Generalizing, in this approach data belonging to a task/entity is segregated, preferably by using a private blockchain as the building block and with membership only limited to the peers contributing data to the task or owned by the entity associated with that blockchain. To facilitate data sharing within the hierarchy, preferably each blockchain in the larger network appoints a "leader" peer that subsequently also joins one or more other blockchains to share the data up the hierarchy. This is depicted in FIG. 5. As shown, the hierarchy 500 comprises blockchains 502, 504 and 506 at a first level 508, blockchains 510 and 512 at a second (intermediate) level 514, and blockchain 516 at a highest level 518. Blockchain 502 includes a leader peer 520 that manages the peers (not shown) associated with the blockchain 502; peer 520 is also a peer participating in the blockchain 510 (although typically not as the leader at the higher level). Likewise, blockchain 512 is shown as including a leader peer 522 that manages the other peers (not shown) associated with the blockchain 512; in this example, peer 522 is also a peer participating in the blockchain 516.

Leader election is a well-known technique in distributed computing. It refers to the notion of designating a single process as an organizer (coordinator) of some task distributed among several computing entity nodes. Before the task is begun, the nodes that comprise the network (in this case, the particular blockchain in the hierarchy) do not know what node will serve as the leader, or they unable to communicate with a current leader. After a leader election algorithm has been run, however, each node throughout the network recognizes a particular, unique node as the task leader. The entity then continues as the leader until a new leader is elected, e.g., because the original leader leaves the network, or fails. A representative leader election algorithm may be implemented with known technologies, such as IBM® Reliable and Consistent Message Streaming (RCMS), which is part of WebSphere® MQ Low Latency Messaging. RCMS provides a layer of high-availability and consistent ordered delivery on top of the high-performance transport fabric offered by Low Latency Messaging. In RCMS, leader election is the algorithm of designating a single tier member as the leader of the tier. By default, RCMS uses a simple deterministic algorithm that is based on a strings comparison. The algorithm compares the names of the members (characters interpreted as type unsigned char) and selects the member with the smallest name (in a lexicographic manner) among the synchronized (or active if this is the first time and no members are synchronized) members to be the leader. Alternatively, RCMS allows an application to override the default leader election algorithm by providing an application-specific algorithm. Of course, the above examples are not intended to be limiting, as any leader election implementation may be utilized.

Before the data is shared with other blockchain(s) in the hierarchy, the leader in this example typically performs specific computations (e.g. aggregation) and/or filtering to declassify the data based on the one or more defined policies. This process of appointing a leader that performs the operations (e.g., declassification and/or filtering, anonymization, etc.) may be repeated at other portions in the hierarchy based on the task/entity formulation and trust relationships among the participating parties.

Figure 6:
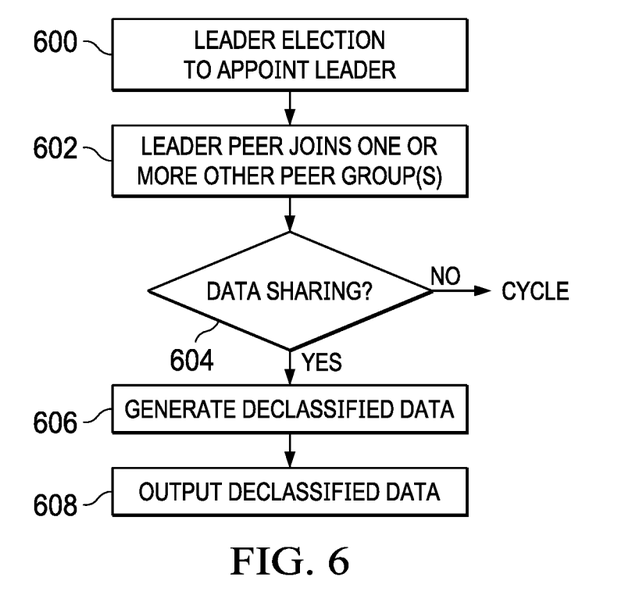
FIG. 6 is a simplified process flow of an operation of a leader peer enforcing a data protection policy in association with data in a blockchain.

FIG. 6 depicts a process flow showing the basic operation of the peer computing entity that is operating as the leader in association with a particular blockchain. Thus, at step 600 the peer is appointed to be the leader. At step 602, the leader joins one or more other blockchains in the hierarchy. Although depicted in this sequence, the joinder may occur at any time. At step 604, a test is performed to determine whether particular data associated with the blockchain is to be shared with other blockchains in the hierarchy. If the outcome of this test is negative, the routine cycles. If, however, the outcome of the test at step 604 indicates that particular data is to be shared, the routine continues at step 606 with the leader performing specific computations and/or filtering with respect to the data. The particular nature of the computations or other filtering will depend on the nature of the particular task at issue, as well as any security or other policy that may apply to that task. A task may be specific to the blockchain, or common to one or more blockchains in the hierarchy. Likewise, a particular policy may be specific to the blockchain, or common to one or more of the blockchains. In a typical use case, and by the operations carried out by the leader at step 606, the data is declassified so that it can be shared externally, typically with one or more of the other blockchains in the hierarchy. Thus, at step 608, the declassified data is shared by the leader with another blockchain. As noted above, and by virtue of joining some other blockchain, the leader can share this declassified data by simple participation in the higher level blockchain. In an alternative embodiment, the leader simply transmits the declassified data to a peer associated with the higher level blockchain and does not actively participate in the higher level group of peers.

Preferably, the participating entities (such as entities 412, 414 and 416 in FIG. 4) have associated therewith a set of tasks that are allocated among them. Typically, entities that participate in the hierarchy also have established trust relationships among them to facilitate the data sharing. These trust relationships may be explicit or implicit, although typically the entities may be characterized as mutually-distrusting in the sense that they are distinct from one another. In a typical use case, data is declassified by a blockchain leader and then shared up the chain. Upon receipt of declassified data from below, that data may then be further processed (aggregated, filtered, etc.), with the resulting data then again declassified and once again shared to a higher level. Information flow may also occur in the opposite direction of course.

While the blockchains typically are private, this is not a limitation, as one or more of the blockchains in the hierarchy may be public. This enables a combination of private and public blockchains for data security.

Channel-Based Blockchain Hierarchy

According to a second embodiment, and instead of associating multiple blockchains into the hierarchy, a single blockchain network comprises multiple "channels" that are configured and managed in this hierarchical manner. A channel is a private "subnet" of communication between two or more specific network members, typically for the purpose of conducting private and confidential transactions between or among those members. A channel may be defined by members, the shared ledger, chaincode application(s), some other service node such as a membership service provider (MSP), or the like. Each transaction on the network is executed on a channel, where each party must be authenticated and authorized to transact on that channel. In one example, each peer that joins a channel has its own identity given by the MSP, which authenticates each peer to its channel peers. To create a new channel, a client may call configuration system chaincode and references one or more properties for the channel. This request creates a genesis block for the channel ledger, and that block preferably stores configuration information such as the channel policy, the identification of the members, and the identity of one or more anchor peers. When adding a new member to an existing channel, the genesis block (or any more recent configuration block) is then shared with the new member. In this approach, a blockchain network has a set a peers, and channels typically are established within the "subset" of the peers.

In this embodiment, a set of peers can join a channel and engage in transaction(s). Using the technique described above, one of the peers in the set is elected as the leader entity, and that peer then has the capability of also joining another channel, e.g., a channel at a higher level in the blockchain. To give a concrete example, assume that peers P1-P6 act as peers of a blockchain network, with peers P1-P3 being part of a first channel C1, and peers P4-P6 being part of a second channel C2. Peers P1-P3 elect peer P1 as the leader of the channel. According to this disclosure, peer P1 then joins channel C2. Data is private in channel C1, and one or more operations (e.g., filtering) are then carried out in C1 before peer P1 shares the results into the second channel C2. Of course, this is just an example scenario.

Thus, in this embodiment, the blockchain hierarchy is a hierarchy of channels (within a single blockchain network). Preferably, each channel has its own ledger. Thus, because P1 (in the above example scenario) is in both channels C1 and C2, it has two ledgers. While ledgers do not share data with one another, ledgers can be queried by channel participants based on chaincode. Chaincode, also called the smart contract, typically is business logic that governs how the different entities or parties in a blockchain network interact or transact with each other. Chaincode thus is the encapsulation (in code) of business network transactions, and chaincode invocations result in sets and gets of the ledger (or world state). Referring back to the example, when particular data processing operation(s) are coded into the chaincode, the peer filters the data as described therein and then passes it on to the other channel (e.g., using an API of the smart contract in that channel). In this context, the smart contract in channel C1 thus is effectively acting as a client for channel C2.

Figure 7:
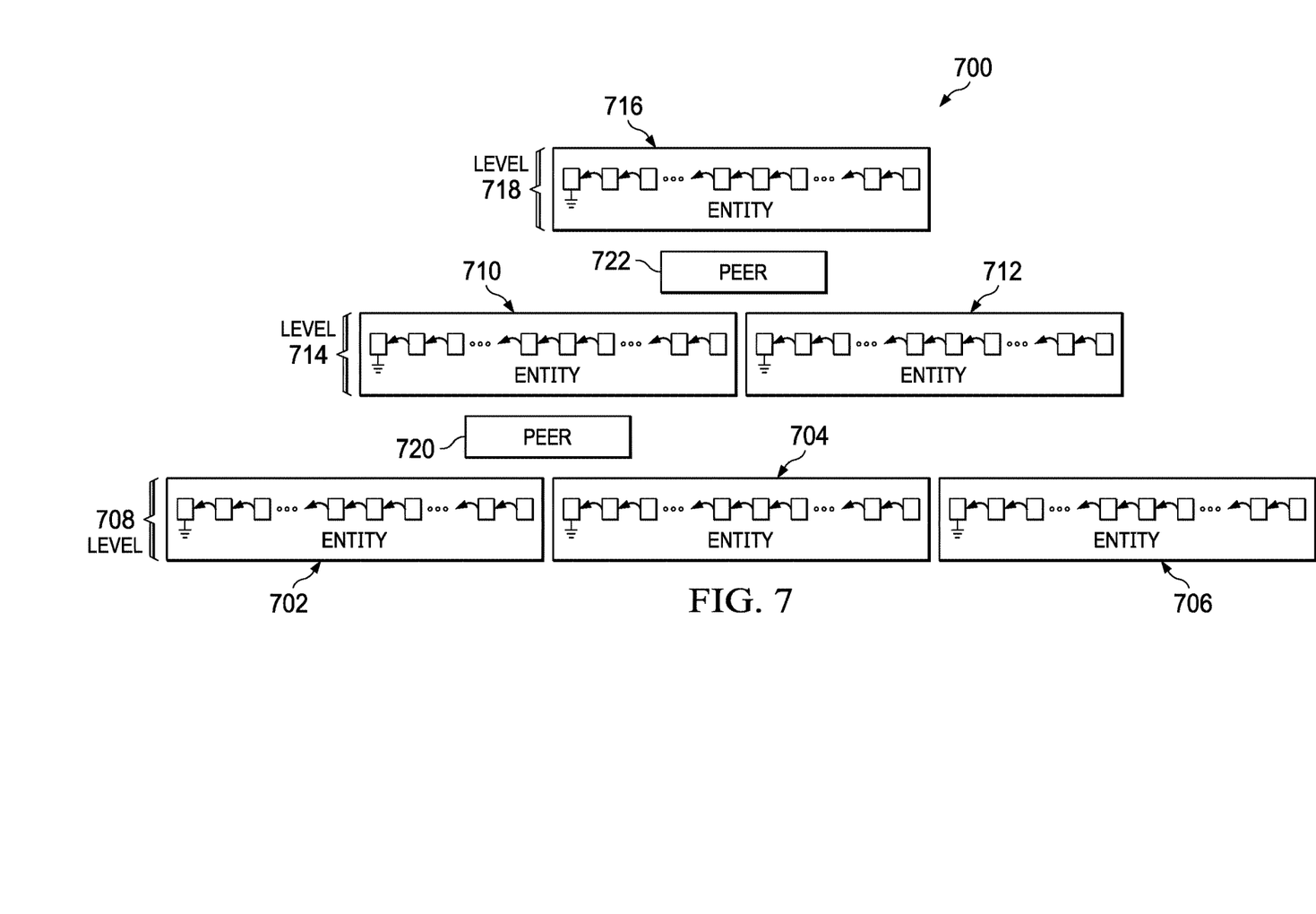
FIG. 7 depicts a multi-level tree-like "channel-based" hierarchy of a second embodiment.

Generalizing, in this variant approach there is a single blockchain network that has "channels" as the building blocks, and with membership only limited to the peers (typically just a subset of the blockchain network) contributing data or transactions to a particular channel. To facilitate data sharing within the hierarchy, and consistent with the approach described above, preferably each set of peers that join a "channel" appoints a "leader" peer that subsequently also joins one or more other channels in the blockchain to share the data with the one or more channels in the blockchain hierarchy. The notion of sharing data across channels in the hierarchy is not intended to be limit the hierarchy to a particular configuration. A representative but non-limiting approach is depicted in FIG. 7.

As shown, the hierarchy 700 comprises channels 702, 704 and 706 at a first level 708, channels 710 and 712 at a second (intermediate) level 714, and channel 716 at a highest level 718. Channel 702 includes a leader peer 720 that manages the peers (not shown) associated with the channel 702; peer 720 is also a peer participating in the channel 710 (although typically not as the leader at the higher level). Likewise, channel 712 is shown as including a leader peer 722 that manages the other peers (not shown) associated with the channel 712; in this example, peer 722 is also a peer participating in the channel 716, and so forth.

Thus, in this variant scenario, the blockchain hierarchy comprises a hierarchy of channels, typically for a single blockchain network. This channel-based approach is advantageous as hierarchies can be created easily "on-the-fly" by simply having a subset of peers come together to start transacting in the channel. In contrast, a blockchain-based hierarchy (the first embodiment described above) typically needs to be created with respect to structure of the hierarchy that is known in advance. Channels thus provide a quick way for hierarchies to be established dynamically.

Typically, there is a leader peer for each member on a particular channel. Transactions are ordered and delivered (e.g., in a block) to each leading peer, which then distributes the block to its member peers and thus across the channel (e.g., using a gossip protocol).

The techniques described herein provide significant advantages. In particular, with blockchains (private or public) or blockchain channels organized in this manner, each of a set of mutually-distrusting parties can still work collectively to enable a set of interactions (between or among the participants) to be verified. The approach enables the resulting blockchain network (the hierarchy of blockchains or channels of a single blockchain) to be agile and adaptive without requirement any infrastructure changes, as changes are localized within the particular peer groups and thus do not affect the larger infrastructure as a whole.

The scheme described herein may be implemented in or in conjunction with various computing architectures including simple n-tier architectures, web portals, federated systems, cloud computing-based systems, and the like.

Still more generally, the subject matter described herein can take the form of an entirely hardware embodiment, an entirely software embodiment or an embodiment containing both hardware and software elements. One or more of the above-described functions is implemented in software, which includes but is not limited to firmware, resident software, microcode, and the like. Furthermore, as noted above, the leader election and management functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the leader functions are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

With respect to a particular blockchain, the "hash" as used herein may be generated using any conventional hashing function, e.g., MD5, SHA-1, SHA-256, or other cryptographic hash. Generalizing, the hashing function is a computational algorithm that produces a fixed-size, unique hash value, also known as a digest, from variable-sized transaction input. Hashes feature a mathematical property in which a hash can be arrived at uniquely from a given input, but the input cannot be derived from its hash value. A given specific input always results in the same hash value being computed.

The techniques herein provide for improvements to another technology or technical field, namely, peer-to-peer distributed networks, as well as improvements to the operational capabilities of such systems when used to provide shared public ledgers having permissioned visibility.

The techniques herein may be used in association with any type of peer-to-peer distributed network that uses cryptographic security, decentralized consensus, and a shared ledger (e.g., that has permissioned visibility).

Having described the invention, what is claimed is as follows.

The invention claimed is:

1. A method of protecting data in a peer-to-peer distributed network having a set of computing entities, comprising:
grouping at least respective first and second subsets of the computing entities into respective first and second networks comprising respective first and second blockchain channels, wherein a channel is a private subnet of communication between or among two or more specific computing entities in the respective subset for conducting one or more private transactions;
selecting a computing entity in the first subset as a leader;

responsive to a determination with the first network that data associated with the first blockchain channel should be shared with the second blockchain channel, associating the first and second blockchain channels into respective first and second levels of a channel hierarchy, and processing the data within the first network according to a data protection policy to generate processed data, wherein the data protection policy is applied to filter sensitive data provided by one or more individual computing entities within the first subset; and sharing the processed data from the first blockchain channel of the first network to the second blockchain channel of the second network across the channel hierarchy;

wherein the computing entity selected as the leader in the first blockchain channel processes the data and shares the processed data with the second blockchain channel.

2. The method as described in claim 1 wherein the data protection policy is associated with a task that is specific to the first subset of the computing entities.

3. The method as described in claim 1 wherein processing the data comprises applying a policy comprising one or more data processing operations.

4. The method as described in claim 1 wherein the respective first or second channel is created dynamically by associating the respective subset of computing entities upon a determination that one or more private transactions between or among the subset are required to be transacted.

5. An apparatus, comprising:

a processor; and computer memory holding computer program instructions executed by the processor and configured to protect data in a peer-to-peer distributed network having a set of computing entities, wherein the apparatus is one of the computing entities, the computer program instructions comprising program code configured to:

group at least respective first and second subsets of the computing entities into respective first and second networks comprising respective first and second blockchain channels, wherein a channel is a private subnet of communication between or among two or more specific computing entities in the respective subset for conducting one or more private transactions;

select a computing entity in the first subset as a leader;

responsive to a determination with the first network that data associated with the first blockchain channel should be shared with the second blockchain channel, associate the first and second blockchain channels into respective first and second levels of a channel hierarchy, and process the data within the first network according to a data protection policy to generate processed data, wherein the data protection policy is applied to filter sensitive data provided by one or more individual computing entities within the first subset; and share the processed data from the first blockchain channel of the first network to the second blockchain channel of the second network across the channel hierarchy;

wherein the computing entity selected as the leader in the first blockchain channel processes the data and shares the processed data with the second blockchain channel.

6. The apparatus as described in claim 5 wherein the data protection policy is associated with a task that is specific to the first subset of the computing entities.

7. The apparatus as described in claim 6 wherein processing the data comprises applying a policy comprising one or more data processing operations.

8. The apparatus as described in claim 5 wherein the respective first or second channel is created dynamically by associating the respective subset of computing entities upon a determination that one or more private transactions between or among the subset are required to be transacted.

9. A computer program product in a non-transitory computer readable medium for use in a data processing system, the computer program product holding computer program instructions which, when executed by the data processing system, are configured to protect data in a peer-to-peer distributed network having a set of computing entities, the data processing system being a computing entity of the set of computing entities, the computer program instructions comprising program code configured to:

group at least respective first and second subsets of the computing entities into respective first and second networks comprising respective first and second blockchain channels, wherein a channel is a private subnet of communication between or among two or more specific peers in the respective subset for conducting one or more private transactions;

select a computing entity in the first subset as a leader;

responsive to a determination with the first network that data associated with the first blockchain channel should be shared with the second blockchain channel, associate the first and second blockchain channels into respective first and second levels of a channel hierarchy, and process the data within the first network according to a data protection policy to generate processed data, wherein the data protection policy is applied to filter sensitive data provided by one or more individual computing entities within the first subset; and share the processed data from the first blockchain channel of the first network to the second blockchain channel of the second network across the channel hierarchy;

wherein the computing entity selected as the leader in the first blockchain channel processes the data and shares the processed data with the second blockchain channel.

10. The computer program product as described in claim 9 wherein the data protection policy is associated with a task that is specific to the first subset of the computing entities.

11. The computer program product as described in claim 9 wherein processing the data comprises applying a policy comprising one or more data processing operations.

12. The computer program product as described in claim 9 wherein the respective first or second channel is created dynamically by associating the respective subset of computing entities upon a determination that one or more private transactions between or among the subset are required to be transacted.

* * * * *